United States Patent
Myung et al.

(10) Patent No.: US 8,352,844 B2
(45) Date of Patent: Jan. 8, 2013

(54) METHOD FOR ENCODING CONTROL INFORMATION IN A WIRELESS COMMUNICATION SYSTEM USING LOW DENSITY PARITY CHECK CODE, AND METHOD AND APPARATUS FOR TRANSMITTING AND RECEIVING THE CONTROL INFORMATION

(75) Inventors: Seho Myung, Suwon-si (KR); Hwan-Joon Kwon, Suwon-si (KR); Jae-Yoel Kim, Suwon-si (KR); Yeon-Ju Lim, Seoul (KR); Sung-Ryul Yun, Suwon-si (KR); Hak-Ju Lee, Incheon (KR); Hong-Sil Jeong, Seoul (KR)

(73) Assignee: Samsung Electronics Co., Ltd (KR)

( * ) Notice: Subject to any disclaimer, the term of this patent is extended or adjusted under 35 U.S.C. 154(b) by 981 days.

(21) Appl. No.: 12/397,017

(22) Filed: Mar. 3, 2009

(65) Prior Publication Data
US 2009/0259913 A1    Oct. 15, 2009

(30) Foreign Application Priority Data

| Mar. 3, 2008 | (KR) | 10-2008-0019650 |
| Mar. 13, 2008 | (KR) | 10-2008-0023575 |
| Nov. 10, 2008 | (KR) | 10-2008-0111170 |
| Feb. 18, 2009 | (KR) | 10-2009-0013635 |

(51) Int. Cl.
*H03M 13/03* (2006.01)
(52) U.S. Cl. ....................... 714/790; 714/774
(58) Field of Classification Search .............. 714/774, 714/790, 786, 792, 794
See application file for complete search history.

(56) References Cited

U.S. PATENT DOCUMENTS

| 7,802,164 B2 * | 9/2010 | Hong et al. | 714/752 |
| 7,882,414 B2 * | 2/2011 | Choi et al. | 714/752 |
| 2007/0143655 A1 | 6/2007 | Niu et al. | |
| 2009/0259913 A1 * | 10/2009 | Myung et al. | 714/752 |

FOREIGN PATENT DOCUMENTS

| EP | 0 981 220 | 2/2000 |
| EP | 1 313 245 | 5/2003 |
| EP | 1 513 258 | 3/2005 |

OTHER PUBLICATIONS

ETSI: "Frame Structure Channel Coding and Modulattion for a Second Generation Digital Terrestrial Television Broadcasting System (DVB-T2)" Digital Video Broadcasting Document, DVB Document A122r1, pp. 1-165, Jan. 2008.

* cited by examiner

*Primary Examiner* — Joshua Lohn
(74) *Attorney, Agent, or Firm* — The Farrell Law Firm, P.C.

(57) ABSTRACT

A method and apparatus for transmitting control information in a wireless communication system using a Low Density Parity Check (LDPC) code is provided. The number of LDPC blocks, through which L1 post-signaling information is to be transmitted, is determined according to the total number of bits of the L1 post-signaling information. The number of input information bits of each LDPC block is calculated when the determined number of LDPC blocks is plural. The number of puncturing bits among parity bits of each LDPC block is determined considering a modulation order. A frame including one or multiple LDPC blocks generated through the preceding steps is transmitted.

82 Claims, 7 Drawing Sheets

METHOD FOR ENCODING CONTROL INFORMATION IN A WIRELESS COMMUNICATION SYSTEM USING LOW DENSITY PARITY CHECK CODE, AND METHOD AND APPARATUS FOR TRANSMITTING AND RECEIVING THE CONTROL INFORMATION

PRIORITY

This application claims priority under 35 U.S.C. §119(a) of a Korean Patent Application filed in the Korean Intellectual Property Office on Mar. 3, 2008 and assigned Serial No. 10-2008-0019650, a Korean Patent Application filed in the Korean Intellectual Property Office on Mar. 13, 2008 and assigned Serial No. 10-2008-0023575, a Korean Patent Application filed in the Korean Intellectual Property Office on Nov. 10, 2008 and assigned Serial No. 10-2008-0111170, and a Korean Patent Application filed in the Korean Intellectual Property Office on Feb. 18, 2009 and assigned Serial No. 10-2009-0013635, the disclosures of which are incorporated herein by reference.

BACKGROUND OF THE INVENTION

1. Field of the Invention

The present invention relates generally to a method and apparatus for encoding control information and transmitting and receiving the control information in a wireless communication system. More particularly, the present invention relates to a method for encoding control information in a wireless communication system using Low Density Parity Check (LDPC) codes, and a method and apparatus for transmitting and receiving the control information.

2. Description of the Related Art

FIG. 1 is a diagram illustrating a transmission scheme for control information in a general wireless communication system.

Referring to FIG. 1, reference numeral 101 denotes a structure of a frame including control information that is transmitted and received in a wireless communication system. Commonly, the frame 101 includes a preamble 102, an P2-L1 signaling 103, an PLP0-L2 signaling 104, and one or more Physical Layer Pipes (PLPs) 105, 106, and 107.

The control information may be transmitted through the preamble 102, the P2-L1 signaling 103, and the PLP0-L2 signaling 104, while data may be transmitted through the PLPs 105, 106, and 107.

The preamble 102 is a signal that is generally used to acquire time and frequency synchronization, and synchronization for a frame boundary at a receiver.

The P2-L1 signaling 103 indicates a part through which an L1 signaling is transmitted. As illustrated in FIG. 1, the P2-L1 signaling 103 can also be referred to as a "P2," because it is transmitted through P2 symbols. The P2 refers to a physical layer signaling, or a Layer 1 (L1) signaling. The physical layer signaling includes static information 108, configurable information 109, and dynamic information 110. The static information 108 includes information that is basically static over the passage of time, and such static information may include information on a cell identifier, a network identifier, the number of Radio Frequency (RF) channels, a frame length, locations of pilot subcarriers, etc. The configurable information 109 includes information that may change in the frames to be transmitted in the future, although without changing on a frame-by-frame basis. Thus, the configurable information 109 may include, for example, information on a service identifier, a modulation order used to transmit data for an individual service, a code rate, etc. The dynamic information 110 includes information that may change on a frame-by-frame basis. Such dynamic information may include information about a location where each PLP carrying service data is transmitted in the current frame, i.e. information about where each PLP starts and ends in the frame.

The PLP0-L2 signaling 104, a part through which an L2 signaling is transmitted, represents a Layer 2 (L2) or Medium Access Control (MAC) signaling. Generally, a PLP on which the L2 information is transmitted may also be referred to as a "PLP0." The PLP0 includes connection information between PLPs and broadcast services to indicate PLPs through which particular services are received. The PLP_1 105, the PLP_2 106, and the PLP_N 107 are service data, and each of them transmits one or a plurality of broadcast service channels. These PLPs, through which actual broadcast data is transmitted, are also called "data PLPs."

A process of actually receiving a particular broadcast service channel in a receiver of a wireless communication system is described below with reference to FIG. 1. Upon acquiring synchronization of the frame through the preamble 102, the receiver gets information on a data transmission scheme and a frame length using the P2-L1 signaling 103, obtains information indicating through which PLP a desired broadcast service channel is transmitted, using the PLP0-L2 signaling 104, and then receives data for broadcast services through the PLPs 105 to 107 carrying data.

In order to provide the services stably in the wireless communication system, transmission error of control information such as the L1 signaling and the L2 signaling should be minimized. The control information is generally encoded before transmission to minimize the transmission error. To this end, there has been a long-felt need for a scheme capable of efficiently encoding the control information.

SUMMARY OF THE INVENTION

The present invention has been made to address at least the above problems and/or disadvantages and to provide at least the advantages described below. Accordingly, an aspect of the present invention provides a method for efficiently encoding control information in a wireless communication system using LDPC codes, and a method and apparatus for transmitting and receiving the control information.

Another aspect of the present invention provides a method for ensuring efficient encoding when control information is divided into a plurality of LDPC blocks before transmission in a wireless communication system using LDPC codes, and a method and apparatus for transmitting and receiving the control information.

An additional aspect of the present invention provides a transmission/reception method and apparatus for dividing control information into a plurality of LDPC blocks considering a modulation order in a wireless communication system using LDPC codes.

According to one aspect of the present invention, a method is provided for transmitting control information in a wireless communication system using a Low Density Parity Check (LDPC) code. A number of LDPC blocks, through which Layer 1 (L1) post-signaling information is to be transmitted, is determined according to a total number of bits of the L1 post-signaling information. A number of input information bits of each LDPC block is calculated when there is a plurality of LDPC blocks. A number of puncturing bits, among parity bits of each LDPC block, are determined in accordance with a modulation order. A frame, including one or more LDPC blocks generated through the preceding steps, is transmitted.

According to another aspect of the present invention, an apparatus is provided for transmitting control information in a wireless communication system using a Low Density Parity Check (LDPC) code. The apparatus includes an LDPC encoder for encoding input information into an LDPC block, and a transmission unit for transmitting a frame including the encoded LDPC block. The apparatus also includes a controller for determining a number of LDPC blocks through which Layer 1 (L1) post-signaling information is to be transmitted, according to a total number of bits of the L1 post-signaling information, calculating a number of input information bits of each LDPC block when there is a plurality of LDPC blocks, determining a number of puncturing bits among parity bits of each LDPC block in accordance with a modulation order, and controlling an operation of the LDPC encoder to encode the L1 post-signaling information into one or more LDPC blocks according to the determined results.

According to an additional aspect of the present invention, a method is provided for transmitting control information in an Orthogonal Frequency Division Multiplexing (OFDM) system using a Low Density Parity Check (LDPC) code. A number of LDPC blocks, through which Layer 1 (L1) post-signaling information is to be transmitted, is determined according to a total number of bits of the L1 post-signaling information. A number of input information bits of each LDPC block is calculated when there is a plurality of LDPC blocks. A number of puncturing bits, among parity bits of each LDPC block, is determined according to a number of OFDM symbols with a Fast Fourier Transform (FFT) size given in the OFDM system. A frame, including one or more LDPC blocks, is transferred.

According to a further aspect of the present invention, an apparatus is provided for transmitting control information in an Orthogonal Frequency Division Multiplexing (OFDM) system using a Low Density Parity Check (LDPC) code. The apparatus includes an LDPC encoder for encoding input information into an LDPC block, and a transmission unit for transmitting a frame including the encoded LDPC block. The apparatus also includes a controller for determining a number of LDPC blocks through which Layer 1 (L1) post-signaling information is to be transmitted, according to a total number of bits of the L1 post-signaling information, calculating a number of input information bits of each LDPC block when there is a plurality of LDPC blocks, determining a number of puncturing bits among parity bits of each LDPC block in accordance with a number of OFDM symbols with a given Fast Fourier Transform (FFT) size, and controlling an operation of the LDPC encoder to encode the L1 post-signaling information into one or more LDPC blocks according to the determined results.

According to another aspect of the present invention, a method is provided for receiving control information in a wireless communication system using a Low Density Parity Check (LDPC) code. Information on a number of bits of Layer 1 (L1) post-signaling information is acquired from a currently received frame. A number of LDPC blocks into which the L1 post-signaling information is divided is calculated. A number of input information bits of each LDPC block is calculated, and a number of puncturing bits, among parity bits of each LDPC block, is calculated. One or more received LDPC blocks are decoded based on the information acquired and calculated in the preceding steps.

According to a further aspect of the present invention, an apparatus is provided for receiving control information in a wireless communication system using a Low Density Parity Check (LDPC) code. The apparatus includes a receiving unit for receiving and decoding control information including Layer 1 (L1) post-signaling information. The apparatus also includes a controller for acquiring information on a number of bits of the L1 post-signaling information from a currently received frame, calculating a number of LDPC blocks into which the L1 post-signaling information is divided, calculating a number of input information bits of each LDPC block, calculating a number of puncturing bits among parity bits of each LDPC block, and controlling an operation of the receiving unit to decode received one or more LDPC blocks based on the information acquired and calculated in the preceding steps.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF PREFERRED EMBODIMENTS

Figure 1:
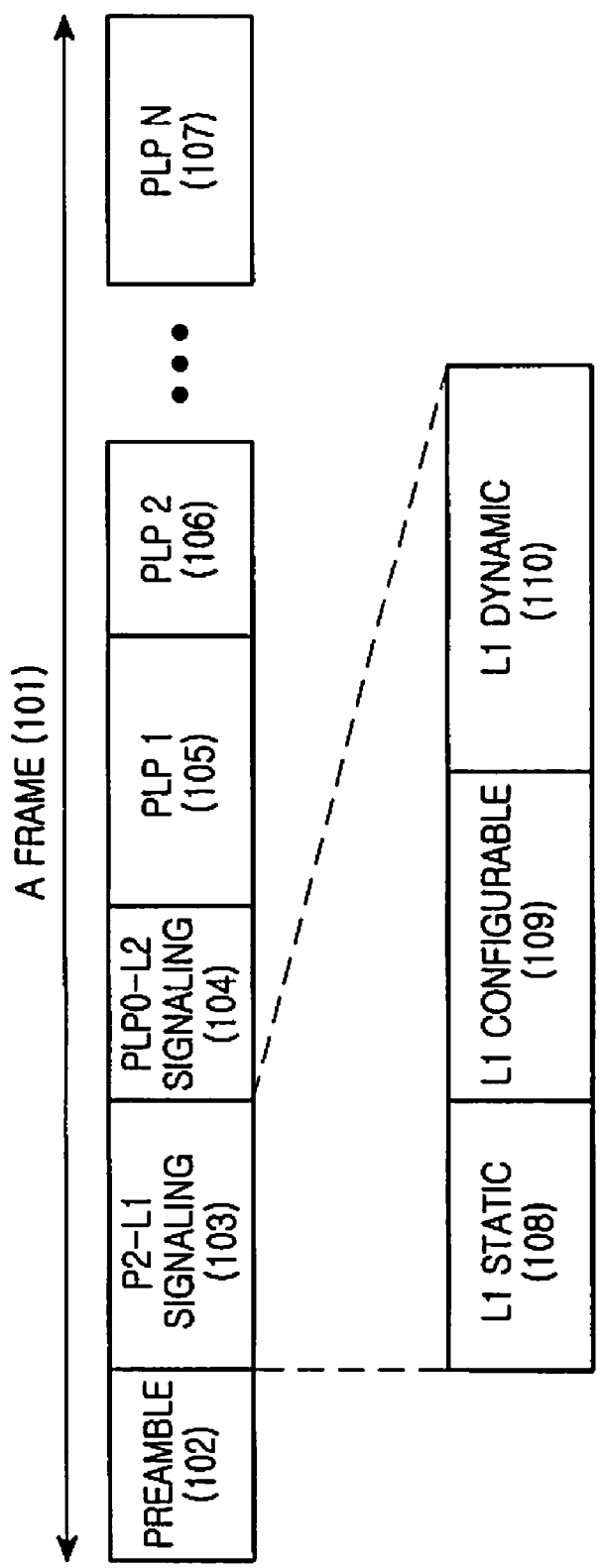
FIG. 1 is a diagram illustrating a transmission scheme for control information in a general wireless communication system.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used by the inventor to enable a clear and consistent understanding of the invention. Accordingly, it should be apparent to those skilled in the art that the following description of preferred embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention provides a method and apparatus for encoding L1 post-signaling information, or control information, into a plurality of LDPC blocks before transmission in a wireless communication system using LDPC codes.

The encoding method proposed by the present invention provides a scheme for encoding L1 static information, L1 configurable information, and L1 dynamic information constituting L1 post-signaling information, in which one or a plurality of coded (or codeword) blocks (i.e. LDPC blocks) are formed according to the total number of bits of the L1 post-signaling information. Although it is assumed in embodiments of the present invention that the L1 post-signaling information includes the L1 static, L1 configurable and L1 dynamic information, the L1 static, L1 configurable and L1 dynamic information should not necessarily be combined together according to requirements of the wireless communication system. Though not mentioned specifically, it can be appreciated that the present invention can be applied even when the L1 post-signaling information is formed of only one or two of the three types of the L1 information. In constructing the multiple LDPC blocks, embodiments of the present invention may divide the L1 post-signaling information into a plurality of blocks so that the LDPC blocks are equal in the number of bits of their input information. In addition to the L1 static information, the L1 configurable information and the L1 dynamic information constituting the L1 post-signaling information, predefined padding bits can be added to each of the blocks. The number of the padding bits may be determined depending on the number of the divided blocks, a modulation scheme (or modulation order) used, or use/non-use of transmit diversity antenna technology.

Figure 2:
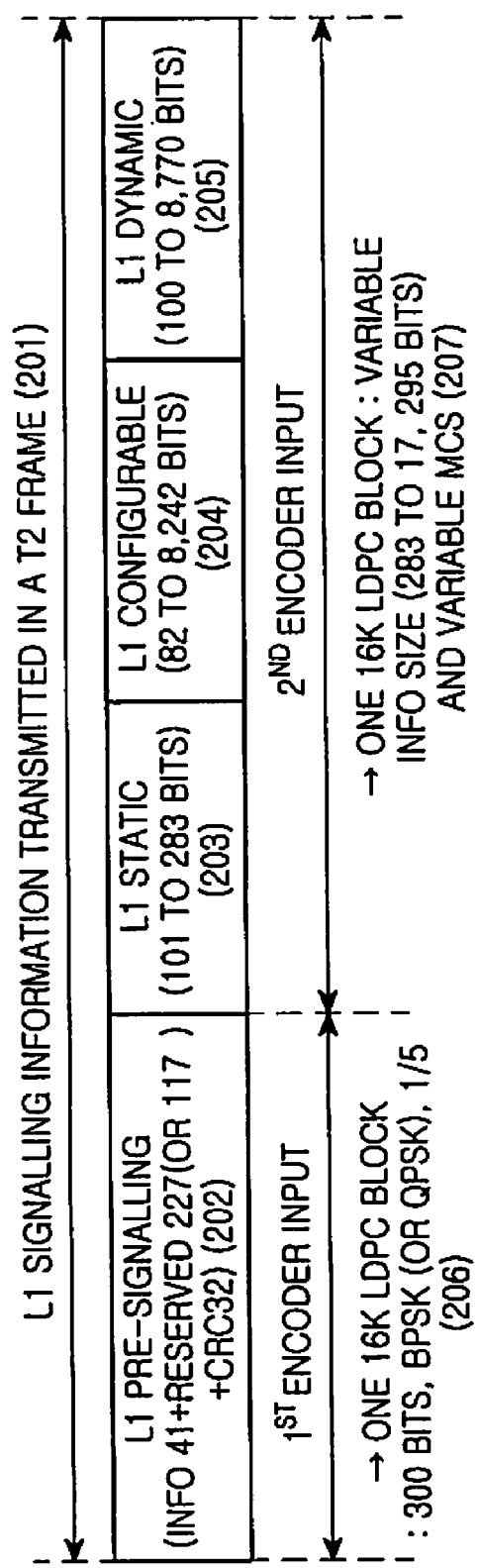
FIG. 2 is a diagram illustrating a process of encoding L1 signaling information used in a wireless communication system to which an embodiment of the present invention is applicable.

FIG. 2 is a diagram illustrating a process of encoding L1 signaling information used in a wireless communication system to which an embodiment of the present invention is applicable.

Referring to FIG. 2, L1 signaling information further includes L1 pre-signaling information 202 in addition to L1 static information 203, L1 configurable information 204 and L1 dynamic information 205 that constitute the L1 post-signaling information as described in connection with FIG. 1. Although it is assumed in FIG. 2 that the L1 post-signaling information includes three types of L1 information 203, 204 and 205, the L1 post-signaling information may also include two types of the L1 information, as described above.

The L1 pre-signaling information 202 is control information indicating information about a transmission method for the L1 static information 203, the L1 configurable information 204, and the L1 dynamic information 205. That is, the L1 pre-signaling information 202 is control information indicating which subcarriers, modulation schemes (e.g. QPSK, 16QAM, 64QAM, etc.) and code rates are used to transmit the L1 static information 203, the L1 configurable information 204, and the L1 dynamic information 205.

As described above, a transmitter of a general wireless communication system generates one LDPC block 206 by LDPC-encoding the L1 pre-signaling information 202 independently, and also generates one LDPC block 207 by LDPC-encoding a plurality of pieces of L1 information (L1 configurable information, L1 dynamic information, etc.) constituting the L1 post-signaling information.

However, when one LDPC block is generated by LDPC-encoding a plurality of pieces of L1 information constituting the L1 post-signaling information, with the plurality of pieces of L1 information combined together, the number of input bits of the LDPC block is variable, so that the number of input bits encoded is also changeable, resulting in a change in decoding performance. Herein, the L1 pre-signaling information and the L1 post-signaling information may be different in their information structures according to the wireless communication system, and not only LDPC encoding but also other encoding methods can be applied for execution of the encoding.

Figure 3:
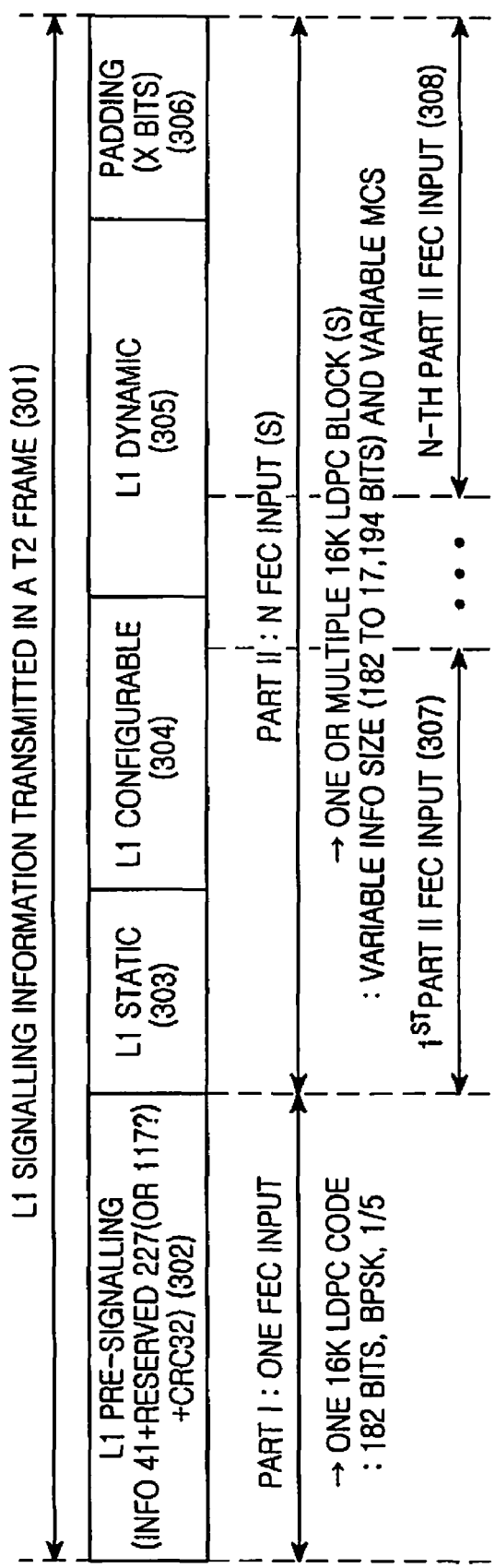
FIG. 3 is a diagram illustrating a scheme for encoding signaling information according to an embodiment of the present invention.

FIG. 3 is a diagram illustrating a scheme for encoding signaling information according to an embodiment of the present invention.

The following description is focused on a method for encoding L1 static information, L1 configurable information and L1 dynamic information, denoted by Part II.

Referring to FIG. 3, an embodiment of the present invention generates an LDPC block as one codeword by LDPC-encoding L1 pre-signaling information 302 independently. Further, the embodiment generates an LDPC block(s) as one or multiple codewords by performing LDPC encoding, once or a plurality of times, on a plurality of pieces of L1 information constituting L1 post-signaling information, for example, L1 static information 303, L1 configurable information 304 and L1 dynamic information 305 combined together. The present invention is characterized by generating multiple codewords (i.e. LDPC blocks) (307, . . . ,308) with respect to the L1 post-signaling information, such that the multiple LDPC blocks (307, . . . ,308) are equal in the number of bits of their input information. This is to keep the constant performance of each LDPC block because the LDPC codes have characteristics that their performances vary according to the number of input information bits. In order to match the plurality of LDPC blocks (307, . . . ,308) in terms of the number of input information bits, x padding bits are added as shown by reference numeral 306. How the number of the added padding bits is determined will be described in detail below. A transmitter's operation of generating and transmitting one or multiple LDPC blocks according to an embodiment of the present invention will now be described in detail with reference to FIG. 4.

Figure 4:
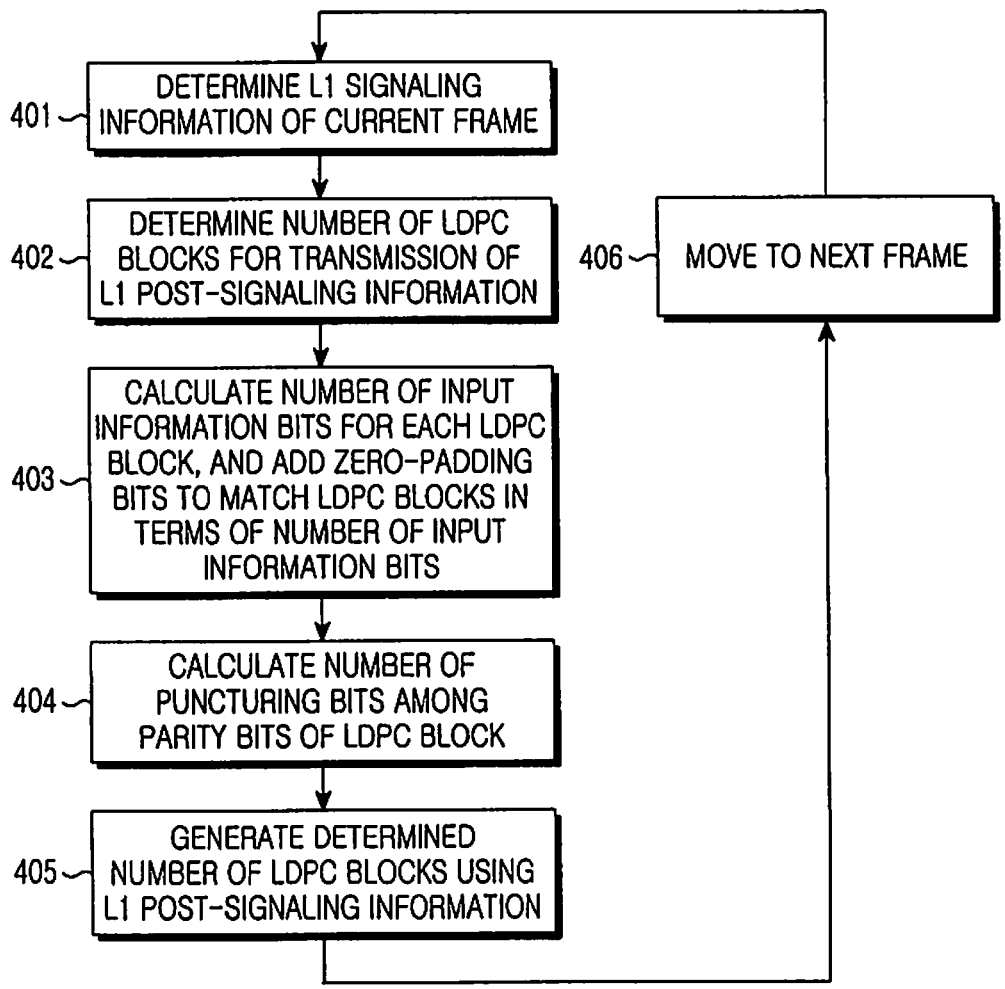
FIG. 4 is a flowchart illustrating an operation of a transmitter according to an embodiment of the present invention.

FIG. 4 is a flowchart illustrating an operation of a transmitter according to an embodiment of the present invention.

Referring to FIG. 4, in step 401, the transmitter determines control information, which is to be transmitted through P2 symbols in the current frame. The control information to be transmitted through the P2 symbols includes L1 pre-signaling information and L1 post-signaling information, as described above.

To LDPC-encode the determined control information before transmission, the transmitter determines into how many coded blocks (i.e. LDPC blocks) it will divide the L1 post-signaling information before transmission, in step 402. The determination is made in accordance with Equation (1).

$$N_{post\_FEC\_Blocks} = \left\lceil \frac{K_{post\_pure}}{K_{bch}} \right\rceil \quad (1)$$

In Equation (1), it is assumed that LDPC inner codes and Bose, Chaudhuri, and Hocquenghem (BCH) outer codes are concatenated to each other.

Here, $N_{post\_FEC\_Blocks}$ denotes the number of the divided LDPC blocks when L1 post-signaling information is divided into multiple LDPC blocks before transmission, $K_{post\_pure}$ denotes a sum of the number of bits of L1 post-signaling information, determined in step 401, and $K_{bch}$ denotes the maximum number of input bits obtained by excluding parity bits of a BCH code and parity bits of an LDPC code from an LDPC block based on a given encoding type (i.e. the maximum number of input bits determined by excluding a parity code from a BCH block). Hereinafter, it is referred to as "the maximum number of input bits of a BCH block."

For example, when an LDPC block is used as a coded block with a size of 16,200 bits, an effective code rate is indicated by $R_{eff}$, and the number of parity bits used in the BCH code is denoted by $N_{bch\_parity}$, the maximum number $K_{bch}$ of input bits of a BCH block is $K_{bch}=16{,}200 \times R_{eff} - N_{bch\_parity}$. For $R_{eff}=4/9$ and $N_{bch\_parity}=168$ bits, $K_{bch}$ becomes 7032 bits. Further, $\lceil x \rceil$ in Equation (1) indicates the smallest integer greater than or equal to x.

However, a value of $K_{bch}$ used in Equation (1) should not necessarily be determined by the above method, and can also be determined by another method according to a given condition of the wireless communication system. Regarding another method, in a wireless communication system using multiple carriers, such as, for example, an Orthogonal Frequency Division Multiplexing (OFDM) system, the maximum number of subcarriers capable of carrying data in one OFDM symbol is determined according to a condition of the system. When the maximum amount of data that can be delivered at once through the maximum number of subcarriers while maintaining the encoding performance considered in a system, is less than the maximum size of an LDPC-coded block, a value of $K_{bch}$ used in Equation (1) can be replaced by a value of the maximum amount of data.

However, when the value of $K_{bch}$ is unchangeable for the reasons that $K_{bch}=16{,}200 \times R_{eff} - N_{bch\_parity}$ has been defined in a system and the value of $K_{bch}$ is already used for another purpose in the system, Equation (1) can be replaced by Equation (2).

$$N_{post\_FEC\_Blocks} = \left\lceil \frac{K_{post\_pure}}{N_{post\_max\_per\_symbol}} \right\rceil \quad (2)$$

In Equation (2), $N_{post\_max\_per\_symbol}$ indicates the maximum number of bits capable of carrying L1 post-signaling information in one OFDM symbol according to a condition of the system, and it is generally set less than or equal to the value of $K_{bch}$.

For a better understanding of the present invention, the following example will be described.

Assuming that in an OFDM system using a 4K Fast Fourier Transform (FFT) mode, a maximum of 3408 subcarriers can be used for one OFDM symbol to transmit encoded L1 signaling information, when 45 subcarriers are allocated for transmission of L1 pre-signaling information encoded in the one OFDM symbol, a maximum of 3363 subcarriers can be allocated for transmission of the encoded L1 post-signaling information. When 16-ary Quadrature Amplitude Modulation (QAM) modulation is assumed to be applied, the 3363 subcarriers can carry a total of 3363×4=13452 bits.

Because the encoded L1 post-signaling information should have higher encoding performance compared with the general data, the amount of the L1 post-signaling information should be limited to guarantee the required minimum encoding performance. That is, among the 13452 bits, the specific number of bits is set to the maximum value as the amount of L1 post-signaling information, and the remaining bits are allocated as parity bits of a BCH code or an LDPC code, or dummy bits when necessary.

For example, assume that L1 post-signaling information of 5780 bits or less is transmitted over one OFDM symbol at the request of the system in order to guarantee the required minimum encoding performance for the encoded L1 post-signaling information. In this case, it can be appreciated that the 5780 bits are less than 7032 bits, or the maximum size of $K_{bch}$, when $R_{eff}$ is 4/9 and $N_{bch\_parity}$ is 168 bits. Also, assume that 168 bits are allocated as $N_{bch\_parity}$ parity bits of a BCH code, 7500 bits are allocated as parity bits of an LDPC code, and the remaining 4 bits are allocated as dummy bits. Then, because the total number of bits of the encoded L1 post-signaling information is 13448 bits and 4 dummy bits are included, the encoded L1 post-signaling information with the dummy bits is mapped to (13448+4)/4=3363 subcarriers, thereby forming a part of an OFDM symbol.

In the above example, (5780+168)/13448 is less 4/9, or a value of $R_{eff}$, because it was set less than 4/9 to secure higher encoding performance than that of the general data. Actually, because 13452×4/9≅5979 is set to obtain a code rate lower than $R_{eff}$ considering encoding performance, the maximum L1 post-signaling information that can be transmitted through one OFDM symbol is always less than 7032 bits.

When the amount of L1 post-signaling information exceeds 5780 bits, the L1 post-signaling information is divided into $N_{post\_FEC\_Blocks}$ LDPC blocks using Equation (1), and transmitted through a process described below. In this case, $K_{bch}$ is set as 5780 bits in Equation (1). However, when a value of $K_{bch}$ is unchangeable as the system already uses it for another purpose, $N_{post\_max\_per\_symbol}$ is set as 5780 bits in Equation (2), and Equation (2) is used instead.

According to another detailed example, assuming that in an OFDM system using a 4K FFT mode, a maximum of 2840 subcarriers can be used for one OFDM symbol to transmit encoded L1 signaling information, when 45 subcarriers are allocated for transmission of L1 pre-signaling information encoded in the one OFDM symbol, a maximum of 2795 subcarriers can be allocated for transmission of encoded L1 post-signaling information. For convenience, when 16QAM modulation is assumed to be applied, the 2795 subcarriers can carry a total of 2795×4=11180 bits.

Assume that among the 11180 bits, the maximum number of bits of L1 post-signaling information transmittable through one OFDM symbol is set as 4748 bits in order to guarantee the required minimum encoding performance according to the system requirements.

It can be understood that the 4748 bits are less than 7032 bits, or the maximum number of input bits of the BCH block, when $R_{eff}=4/9$ and a size of $N_{bch\_parity}$ is 168 bits. Also, assume that 168 bits are allocated as parity bit of a BCH code, 6260 bits are allocated as parity bits of an LDPC code, and the remaining 4 bits are allocated as dummy bits. Then, because the total number of bits of the encoded L1 post-signaling information is 11176 bits and 4 dummy bits are included, the encoded L1 post-signaling information with the dummy bits is mapped to (11176+4)/4=2795 subcarriers, thereby forming a part of an OFDM symbol.

In the above example, it is noted that (4748+168)/11180 is less than 4/9, or a value of $R_{eff}$.

When the amount of the L1 post-signaling information exceeds 4748 bits, the L1 post-signaling information is divided into $N_{post\_FEC\_Blocks}$ LDPC blocks using Equation (1), and transmitted through a process described below. In this case, $K_{bch}$ is set as 4748 bits in Equation (1). However, when a value of $K_{bch}$ is unchangeable as the system already uses it for another purpose, $N_{post\_max\_per\_symbol}$ is set as 4748 bits in Equation (2), and Equation (2) is used instead.

In accordance with embodiments of the present invention, $K_{bch}$ can be defined as a value determined according to a purpose needed in the system, and it can be or less than or equal to the maximum number of input bits of, for example, a BCH block. However, when a value of $K_{bch}$ is unchangeable as the system already uses it for another purpose, $N_{post\_max\_per\_symbol}$ can be set to a proper value in Equation (2), and Equation (2) can be used instead of Equation (1).

As described above, $K_{bch}$ in Equation (1) can be set to a proper value according to requirements of the wireless communication system.

Referring back to FIG. 4, in step 403, the transmitter divides a sum $K_{post\_pure}$ of the number of bits of the L1 post-signaling information by the number $N_{post\_FEC\_Blocks}$ of the LDPC blocks, determined in step 402. In the case where the $K_{post\_pure}$ cannot be divided by $N_{post\_FEC\_Blocks}$, the number $N_{post\_FEC\_Blocks}$ of specific padding bits (each bit value is '0') becomes 2 when $K_{post\_pure}$, is 7033 bits, for example. Because the $K_{post\_pure}$ cannot be divided by 2, one bit of 0 is added to the $K_{post\_pure}$ to make it an even number, and the resultant value is divided by 2. In the above, the number of bits of an information stream after padding bits are added thereto is called $K_{post}$, and a value obtained by dividing it by $N_{post\_FEC\_Blocks}$ is referred to as $K_{sig}$. In the above example, $K_{sig}$ becomes (7033+1)/2)=3,517 bits. In other words, it is meant that two information streams of 3,517 bits obtained by adding one bit to $K_{post\_pure}$ of 7033 bits and dividing the result by two are intended to be transmitted over two LDPC blocks through two LDPC encodings.

In step 404, the transmitter calculates the number of parity bits to be punctured, among parity bits of each LDPC block. The calculation for the number of puncturing bits is subject to change according to $K_{post}$, a modulation scheme (or a modulation order), the number $N_{fixedP2}$ of OFDM symbols used for P2 transmission (i.e. the number of OFDM symbols with a given FFT size), etc. The number of puncturing bits can be calculated in the following manner. The number of puncturing bits can be calculated in the process of first calculating the temporary number of puncturing bits, correcting the number of puncturing bits taking into account $N_{fixedP2}$ and a structure of a bit interleaver used for transmitting the L1 post-signaling information, and then updating the final number of puncturing bits. The process of calculating the number of puncturing bits will be described using equations, as follows.

Step 1

First, the temporary number $N_{punc\_temp}$ of puncturing bits is calculated in accordance with Equation (3).

$$N_{punc\_temp} = \left\lfloor \frac{6}{5} \times (K_{bch} - K_{sig}) \right\rfloor \quad (3)$$

where $\lfloor x \rfloor$ indicates the greatest integer not greater than x.

In Equation (3), $K_{bch}$ denotes the maximum number of input bits of a BCH block, and $K_{sig}$ is a value determined by dividing the number $K_{post}$ of bits obtained by adding padding bits to a sum $K_{post\_pure}$ of the number of bits of L1 post-signaling information, by the number $N_{post\_FEC\_Blocks}$ of LDPC blocks.

In Equation (3), $K_{bch} = 16,200 \times R_{eff} - N_{bch\_parity}$, first defined in Equation (1), is used intact without change. For example, $K_{bch}$ is 7032 bits, when an LDPC block with a size of 16,200 bits is used, an effective code rate $R_{eff}$ is 4/9, and $N_{bch}$ parity is 168 bits.

Step 2

After the temporary number of puncturing bits is found, the temporary number $N_{post\_temp}$ of codeword bits is calculated in accordance with Equation (4).

$$N_{post\_temp} = K_{sig} + N_{bch\_parity} + 16,200 \times (1 - R_{eff}) N_{punc\_temp} \quad (4)$$

Step 3

Thereafter, based on the temporary number of codeword bits, the final number of codeword bits (or the number of bits of each LDPC block) is calculated in accordance with Equation (5) taking a modulation order into account.

$$N_{post} = \begin{cases} \text{If } N_{fixedP2} = 1, & \left\lceil \frac{N_{post\_temp}}{2\eta_{MOD}} \right\rceil \times 2\eta_{MOD}, \\ \text{Otherwise,} & \left\lceil \frac{N_{post\_temp}}{\eta_{MOD} \times N_{fixedP2}} \right\rceil \times \eta_{MOD} \times N_{fixedP2} \end{cases} \quad (5)$$

where $\eta_{MOD}$ indicates a modulation order, and is 1, 2, 4 and 6 for BPSK, QPSK, 16-QAM, and 64-QAM, respectively, and $N_{fixedP2}$ is the number of OFDM symbols used for P2 transmission (i.e. transmission of L1 signaling information).

The reason for adjusting the number of codeword bits in Equation (5) is to ensure that the number of modulation symbols after modulation of each LDPC block becomes a multiple of $N_{fixedP2}$, and also to guarantee that the number of bits of each LDPC block becomes a multiple of the number of columns of a block interleaver used in a bit interleaving process. The block interleaving is commonly used only for high-order modulation such as 16QAM and 64QAM, and the number of its columns used is generally $2 \times \eta_{MOD}$.

In Equation (5), the expression is divided into two sub-expressions on the basis of a value of $N_{fixedP2}$, to ensure that the number of symbols after modulation always becomes a multiple of $N_{fixedP2}$. However, when there is no need to necessarily satisfy the multiple relation of $N_{fixedP2}$ according to the requirements of the communication system to which the present invention is applied, it is enough to apply only the first expression for $N_{fixedP2} = 1$ in Equation (5). In this case, the factors determining the result of Equation (5) are a modulation order and the number of columns of a block interleaver.

In sum, Equation (5) may be applied briefly regardless of $N_{fixedP2}$ according to the requirements of the communication system to which the present invention is applied.

In accordance with Equation (5), it is ensured that when a value of $N_{fixedP2}$ is not 1, the number of modulation symbols after modulation of an LDPC block is a multiple of $N_{fixedP2} \times \eta_{MOD}$. However, in the general case, it cannot be ensured that the number of modulation symbols is $2 \times \eta_{MOD}$. Thus, when the number of columns for block interleaving is set to $2 \times \eta_{MOD}$, Equation (5) may not be suitable. In other words, in a case where in an arbitrary system, the number of columns for block interleaving is always set to $2 \times \eta_{MOD}$ and $N_{fixedP2}$ is not 1, Equation (5) may not be suitable to the system if the number of modulation symbols does not satisfy a multiple of 2. Therefore, for $N_{fixedP2} \neq 1$, when the number of modulation symbols does not satisfy a multiple of 2, the final number of codeword bits (i.e. the number of bits of each LDPC block) can be calculated using Equation (6).

$$N_{post} = \left\lceil \frac{N_{post\_temp}}{2 \times \eta_{MOD} \times N_{fixedP2}} \right\rceil \times 2 \times \eta_{MOD} \times N_{fixedP2} \quad (6)$$

Equation (6) is proposed so that it can be used without specific restrictions on a value of $N_{fixedP2}$.

A value of $N_{fixedP2}$ may be set as a value having a particular meaning according to the requirements of the system. For example, when a value of $N_{fixedP2}$ is set to the same value as $N_{post\_FEC\_Blocks}$ in Equation (2), the value of $N_{fixedP2}$ can be determined, once $N_{post\_FEC\_Blocks}$ is determined in the system. If this is applied to Equation (6), Equation (6) can be written as Equation (7).

$$N_{post} = \left\lceil \frac{N_{post\_temp}}{2\eta_{MOD} \times N_{post\_FEC\_Blocks}} \right\rceil \times 2\eta_{MOD} \times N_{post\_FEC\_Blocks} \quad (7)$$

In addition, a value of $N_{fixedP2}$ can be divided according to a condition of the system, similarly to Equation (5), and set as different values. For example, assume that the system uses a time interleaving technique during transmission of L1 post-signaling information, and has detected an "L1_TI_depth" field in signaling information having information as set forth in Table 1, from the L1 pre-signaling information.

TABLE 1

| L1_TI_depth | Time Interleaving Depth $N_{L1\_TI\_depth}$ |
|---|---|
| 00 | No time interleaving |
| 01 | $N_{post\_FEC\_Blocks}$ OFDM symbols |
| 10 | 4 OFDM symbols |
| 11 | 8 OFDM symbols |

In accordance with Table 1, when the "L1_TI_depth" is 10 or 11, the system transmits L1 post-signaling information over 4 or 8 OFDM symbols regardless of a value of $N_{post\_FEC\_Blocks}$. Therefore, Equation (8) can be used according to a value of "L1_TI_depth."

$$N_{post} = \begin{cases} \text{If L1\_TI\_depth = 00 or 01,} \\ \left\lceil \frac{N_{post\_temp}}{2\eta_{MOD} \times N_{post\_FEC\_Blocks}} \right\rceil \times 2\eta_{MOD} \times N_{post\_FEC\_Blocks}, \\ \text{Otherwise,} \\ \left\lceil \frac{N_{post\_temp}}{2\eta_{MOD} \times N_{L1\_TI\_depth}} \right\rceil \times 2\eta_{MOD} \times N_{L1\_TI\_depth}. \end{cases} \quad (8)$$

where a value of $N_{L1\_TI\_depth}$ is 4 for "L1_TI_depth"=10, and 8 for "L1_TI_depth"=1.

To subdivide the L1 post-signaling information according to application/non-application of time interleaving, for "L1_TI_depth"=00 or 01, the final number $N_{post}$ of codeword bits (i.e. the number of bits of each LDPC block) can be given as Equation (9).

$$N_{post} = \begin{cases} \text{L1\_TI\_depth = 00;} \\ \left\lceil \frac{N_{post\_temp}}{2\eta_{MOD}} \right\rceil \times 2\eta_{MOD}, \\ \text{L1\_TI\_depth = 01;} \\ \left\lceil \frac{N_{post\_temp}}{2\eta_{MOD} \times N_{psst\_FEC\_locks}} \right\rceil \times 2\eta_{MOD} \times N_{post\_FEC\_Blocks}, \\ \text{otherwise,} \\ \left\lceil \frac{N_{post\_temp}}{2\eta_{MOD} \times N_{L1\_TI\_depth}} \right\rceil \times 2\eta_{MOD} \times N_{L1\_TI\_depth}. \end{cases} \quad (9)$$

In addition, for "L1_TI_depth"=00 or 01, because "L1_TI_depth" is always a multiple of 2, Equation (10) is also possible.

$$N_{post} = \begin{cases} \text{If L1\_TI\_depth = 00 or 01,} \\ \left\lceil \frac{N_{post\_temp}}{2\eta_{MOD} \times N_{post\_FEC\_Blocks}} \right\rceil \times 2\eta_{MOD} \times N_{post\_FEC\_Blocks}, \\ \text{Otherwise,} \\ \left\lceil \frac{N_{post\_temp}}{\eta_{MOD} \times N_{L1\_TI\_depth}} \right\rceil \times \eta_{MOD} \times N_{L1\_TI\_depth}. \end{cases} \quad (10)$$

In this case, it is guaranteed that $N_{post}$ is still a multiple of $2 \times \eta_{MOD}$.

Step 4

Finally, the final number of puncturing bits among the parity bits of each LDPC block is updated. The final number $N_{punc}$ of puncturing bits is calculated in accordance with Equation (11).

$$N_{punc} = N_{punc\_temp} - (N_{post} - N_{post\_temp}) \quad (11)$$

where $N_{punc\_temp}$ denotes the temporary number of puncturing bits, calculated in Step 1, $N_{post}$ denotes the final number of codeword bits (i.e. the number of bits of each LDPC block), and $N_{post\_temp}$ denotes the temporary number of codeword bits, calculated in Step 2.

Referring back again to FIG. 4, After calculating the number of puncturing bits among the parity bits of each LDPC block, the transmitter generates, in step 405, as many LDPC blocks as the number of coded blocks, determined in step 402, using the L1 post-signaling information with padding bits. The LDPC blocks are transmitted after as many parity bits as the calculated number of puncturing bits are punctured. In step 406, the transmitter moves to the next frame, and then repeats the above operation of steps 401 to 405.

An example of the calculation process in the operation of the transmitter is summarized in Table 2.

TABLE 2

| Step | Operation |
|---|---|
| 1 | Calculate Equation (2): $N_{post\_FEC\_Blocks} = \left\lceil \frac{K_{post\_pure}}{N_{post\_max\_per\_symbol}} \right\rceil$ |
| 2 | 1) If needed, a proper value is added to $K_{post\_pure}$ so that it becomes a multiple of $N_{post\_FEC\_Blocks}$, and the resultant value is defined as $N_{post}$. When $K_{post\_pure}$ is a multiple of $N_{post\_FEC\_Blocks}$ from the beginning, $N_{post}$ and $K_{post\_pure}$ have the same value. 2) $K_{post}/K_{post\_pure}$ is defined as $K_{sig}$. |
| 3 | Calculate Equation (3): $N_{punc\_temp} = \left\lfloor \frac{6}{5} \times (K_{bch} - K_{sig}) \right\rfloor$ |
| 4 | Calculate Equation (4): $N_{post\_temp} = K_{sig} + N_{bch\_parity} + 16{,}200 \times (1 - R_{eff}) - N_{punc\_temp}$ |
| 5 | Calculate $N_{post}$ using Equation (8) in accordance with a time interleaving technique defined in Table 1, which is applied to post-signaling. |
| 6 | Calculate Equation (11): $N_{punc} = N_{punc\_temp} - (N_{post} - N_{post\_temp})$ |

Figure 5:
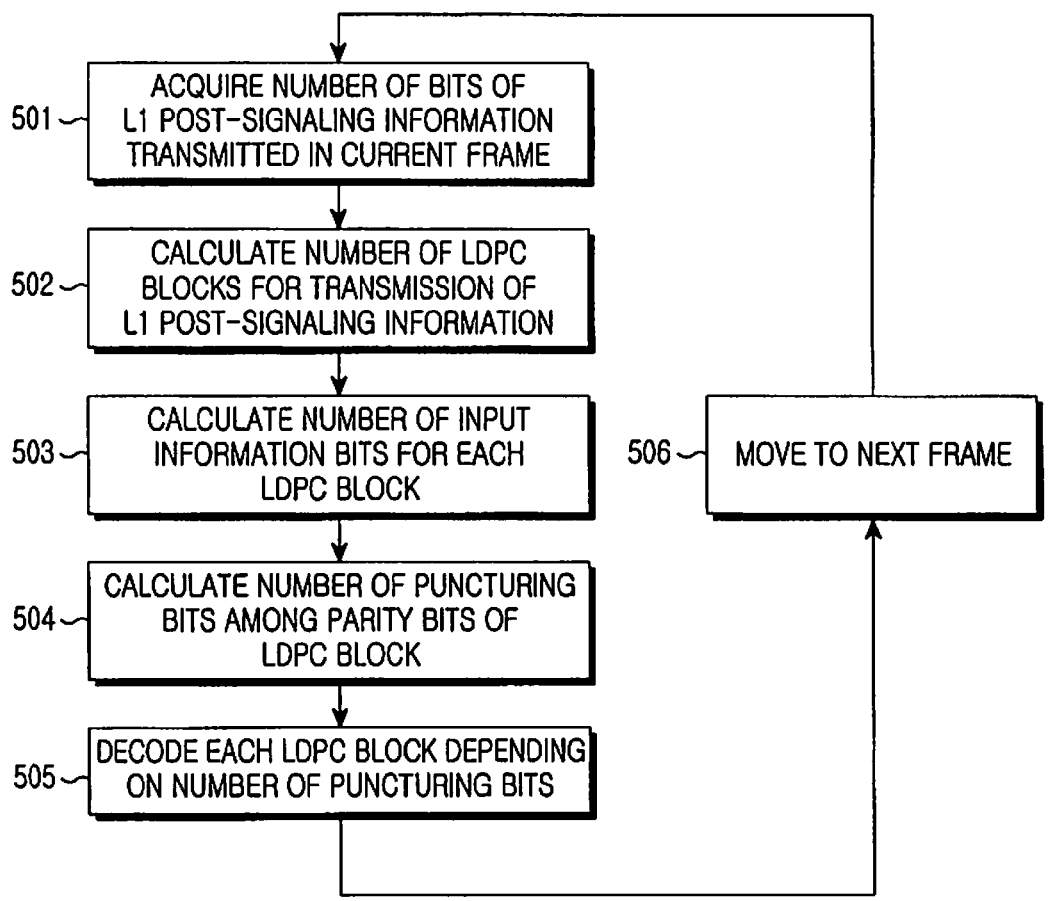
FIG. 5 is a flowchart illustrating an operation of a receiver according to an embodiment of the present invention.

FIG. 5 is a flowchart illustrating an operation of a receiver according to an embodiment of the present invention.

Referring to FIG. 5, in step 501, the receiver acquires the number of bits of L1 post-signaling information transmitted in the current frame by receiving and demodulating L1 pre-signaling information. The number of bits of the L1 post-signaling information means $K_{post}$ described in FIG. 4, to which padding bits are added. In step 502, the receiver calculates the number of coded blocks (i.e. LDPC blocks) through which L1 post-signaling information is transmitted, in accordance with Equation (12).

$$N_{post\_FEC\_Blocks} = \frac{K_{post}}{K_{bch}} \quad (12)$$

It is to be noted that the value of Equation (12) can also be calculated as Equation (13) according to the requirements of the system.

$$N_{post\_FEC\_Blocks} = \frac{K_{post}}{N_{post\_max\_per\_symbol}} \quad (13)$$

In step 503, the receiver calculates the number $K_{sig}$ of input information bits for each LDPC block (i.e. the number of bits of input information with padding bits) in accordance with Equation (14).

$$K_{sig} = \frac{K_{post}}{K_{post\_FEC\_Blocks}} \quad (14)$$

In step 504, the receiver calculates the number of puncturing bits among parity bits of each LDPC block. The calculation process of step 504 is equal to the method described in FIG. 4 using Equation (3), Equation (4), and Equation (5) to Equation (11). In step 505, the receiver decodes as many LDPC blocks as the number of LDPC blocks, determined in step 502, through an LDPC decoding process using the number of puncturing bits, calculated in step 504, and acquires L1 post-signaling information from each decoded LDPC block. In step 506, the receiver moves to the next frame and repeats the operation of steps 501 to 505.

Figure 6:
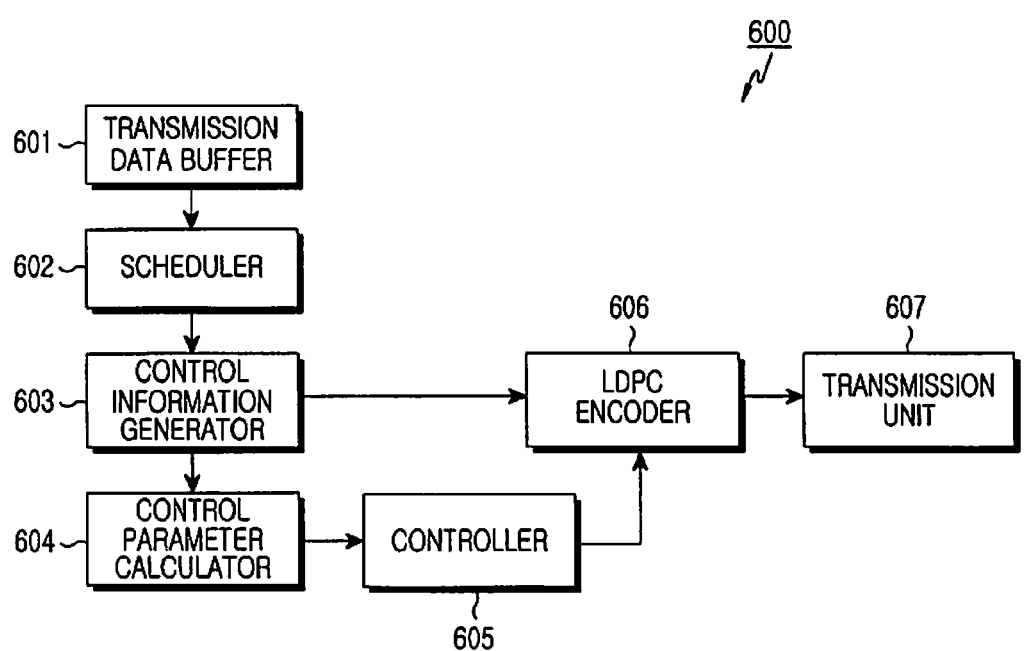
FIG. 6 is a block diagram illustrating a structure of a transmitter according to an embodiment of the present invention.

FIG. 6 is a block diagram illustrating a structure of a transmitter 600 according to an embodiment of the present invention. The transmitter 600 in FIG. 6 represents an apparatus for transmitting L1 signaling information as control information.

Referring to FIG. 6, the transmitter 600 includes a transmission data buffer 601, a scheduler 602, a control information generator 603, a control parameter calculator 604, a controller 605, an LDPC encoder 606, and a transmission unit 607. In embodiments of the present invention, the control information, which is encoded into one or multiple LDPC blocks before transmission, includes L1 pre-signaling information and L1 post-signaling information as physical layer signaling information, as described above.

When a wireless communication system provides broadcast services, the transmission data buffer 601 buffers service data (i.e. PLPs) that a plurality of broadcast service channels should transmit. The scheduler 602 performs scheduling depending on a state of the service data (PLPs) buffered in the transmission data buffer 601. The scheduling operation may include determining L1 pre-signaling information and L1 post-signaling information as control information to be transmitted, for every frame. The scheduling result is provided to the control information generator 603. The control information generator 603 generates detailed field values of the L1 pre-signaling information and the L1 post-signaling information as control information (i.e. P2 information). The L1 post-signaling information includes L1 configurable information 204, L1 dynamic information 205, or the like.

The control parameter calculator 604 calculates the number of LDPC blocks, the number of modulation symbols, the number of padding bits, the number of puncturing bits among parity bits of each LDPC block, etc. as control parameters used for encoding control information into one or plural LDPC blocks before transmission as described in FIG. 4, using the field values received from the control information generator 603. The control parameters calculated by the control parameter calculator 604 are provided to the controller 605, and the controller 605 controls an encoding operation of the LDPC encoder 606 according to the calculated parameters. The LDPC encoder 606, under the control of the controller 605, encodes the L1 pre-signaling information and the L1 post-signaling information received from the control information generator 603, into LDPC blocks independently. Herein, in accordance with the process described in FIG. 4, the L1 pre-signaling information is divided into one or more blocks and zero-padding bits are added thereto, so that the information is output as one or multiple LDPC blocks. Parity bits, the number of which is equal to the calculated number of puncturing bits, are punctured from the LDPC blocks. The output of the LDPC encoder 606 is provided to the transmission unit 607, and the transmission unit 607 transmits the LDPC-encoded control information with a frame having a predetermined format. Although the control parameter calculator 604 and the controller 605 are illustrated as separate components in FIG. 6, they can be constructed in one controller.

Figure 7:
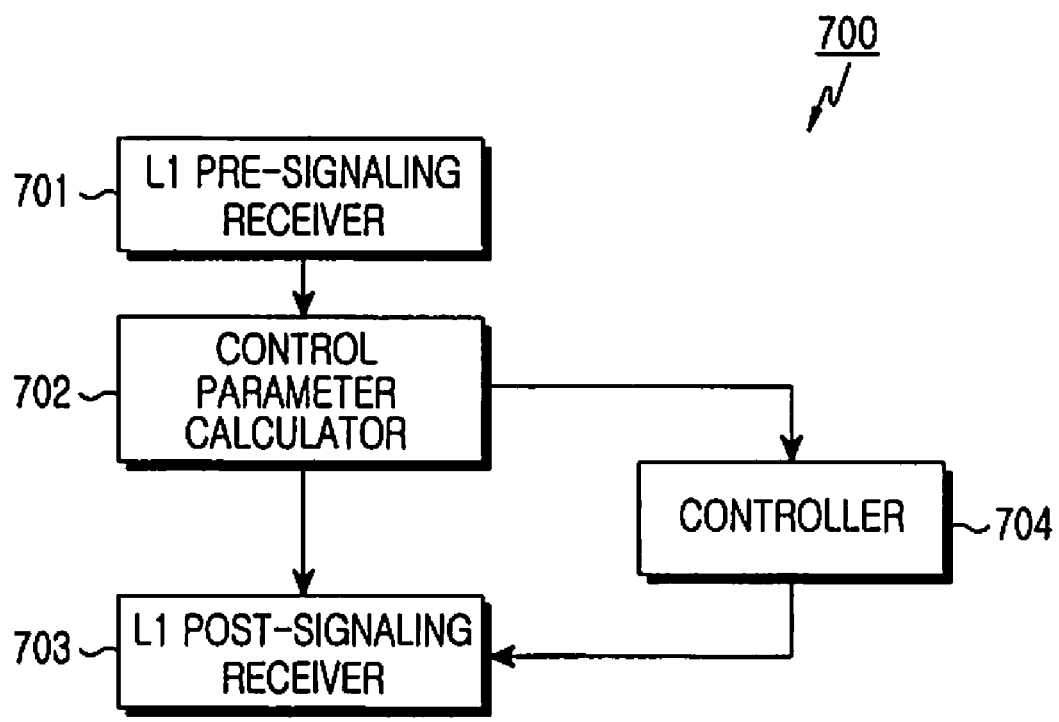
FIG. 7 is a block diagram illustrating a structure of a receiver according to an embodiment of the present invention.

FIG. 7 is a block diagram illustrating a structure of a receiver 700 according to an embodiment of the present invention. The receiver 700 in FIG. 7 represents an apparatus for receiving L1 signaling information as control information.

Referring to FIG. 7, the receiver 700 includes an L1 pre-signaling receiver 701, a control parameter calculator 702, an L1 post-signaling receiver 703, and a controller 704.

The receiver 700 in FIG. 7 receives L1 pre-signaling information and L1 post-signaling information as control information for reception of service data. The L1 pre-signaling information is control information indicating a transmission method for L1 post-signaling information including L1 configurable information 204 and L1 dynamic information 205. The L1 pre-signaling receiver 701 receives the L1 pre-signaling information, acquires information on subcarriers, a modulation scheme (e.g. QPSK, 16QAM, 64QAM, etc.) and a code rate it will use as a transmission method for the L1 post-signaling information, and also acquires information on the number of modulation symbols.

The control parameter calculator 702 calculates control parameters including the number of LDPC blocks, the number of padding bits for LDPC blocks, the number of puncturing bits among parity bits of the LDPC blocks, and the number of modulation symbols in the manner described in FIG. 5, using the information provided from the L1 pre-signaling receiver 701. The control parameters calculated by the control parameter calculator 702 are provided to the controller 704. The controller 704 controls an LDPC decoding operation on one or multiple LDPC blocks received at the L1 post-signaling receiver 703 using the control parameters, and the L1 post-signaling receiver 703 decodes the L1 post-signaling information. Although the control parameter calculator 702 and the controller 704 are illustrated as separate components in FIG. 7, they may be constructed in one controller.

As is apparent from the foregoing description, the embodiments of the present invention can divide control information into multiple LDPC blocks and perform LDPC encoding thereon considering the characteristics that decoding performance depends on the number of input information bits of each LDPC block, so that encoding performance of each LDPC block can be constantly maintained.

In addition, the embodiments of the present invention can divide control information, i.e. L1 post-signaling information, into a plurality of blocks having the same number of input bits, insert padding bits in each of the divided blocks, and perform LDPC encoding thereon, thereby enabling more efficient encoding. Therefore, it is possible to perform more efficient signaling information transmission/reception through LCPC encoding.

The embodiments of the present invention can also be embodied as computer-readable codes on a computer-readable recording medium. The computer-readable recording medium is any data storage device that can store data, which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for transmitting control information in a broadcasting/communication system, the method comprising the steps of:
    determining a number of coded blocks through which Layer 1 (L1) signaling information is to be transmitted, based on a number of bits of the L1 signaling information included in the control information;
    calculating a number of input information bits of each coded block when there is a plurality of coded blocks;
    determining a number of puncturing bits of each coded block to be transmitted; and
    generating the determined number of coded blocks, each coded block comprising the calculated number of input information bits and punctured based on the determined number of puncturing bits;
    transmitting a frame including one or more coded blocks generated through the preceding steps.

2. The method of claim 1, wherein determining a number of coded blocks comprises:
    determining the number of coded blocks depending on a value obtained by dividing the number of bits of the L1 signaling information by a maximum number of input bits of a Bose, Chaudhuri, and Hocquenghem (BCH) block.

3. The method of claim 2, wherein the maximum number of input bits of the BCH block is determined in accordance with the following equation:

$$K_{bch} = 16{,}200 \times R_{\mathit{eff}} - N_{bch\_parity}$$

when a Low Density Parity Check (LDPC) block is used as a coded block with a size of 16,200 bits, an effective code rate is indicated by $R_{\mathit{eff}}$, and the number of parity bits used in the BCH code is denoted by $N_{bch\_parity}$.

4. The method of claim 1, wherein the number of coded blocks is determined in accordance with the following equation:

$$N_{post\_FEC\_Blocks} = \left\lceil \frac{K_{post\_pure}}{K_{bch}} \right\rceil$$

where $N_{post\_FEC\_Blocks}$ denotes the number of coded blocks, $K_{post\_pure}$ denotes the number of bits of the L1 signaling information, $K_{bch}$ denotes a maximum number of input bits of a BCH block, and $\lceil x \rceil$ indicates a minimum integer greater than or equal to x.

5. The method of claim 1, wherein each of the coded blocks has an equal number of input information bits.

6. The method of claim 1, wherein calculating a number of input information bits of each coded block comprises:
    finding a value by adding one or more padding bits to the number of bits of the L1 signaling information; and
    calculating the number of input information bits of each coded block by dividing the value by the number of coded blocks.

7. The method of claim 1, wherein determining a number of puncturing bits comprises:
    calculating a temporary number of puncturing bits and a temporary number of codeword bits of each coded block;
    calculating a final number of codeword bits of each coded block based on a modulation order and the temporary number of codeword bits; and
    calculating a final number of puncturing bits based on the temporary number of puncturing bits, the temporary number of codeword bits and the final number of codeword bits.

8. The method of claim 7, wherein calculating a temporary number of puncturing bits comprises:
    calculating the temporary number of puncturing bits based on a difference between a maximum number of input information bits of a BCH block and the number of input information bits of each coded block.

9. The method of claim 7, wherein the temporary number of puncturing bits is determined in accordance with the following equation:

$$N_{punc\_temp} = \left\lfloor \frac{6}{5} \times (K_{bch} - K_{sig}) \right\rfloor$$

where $N_{punc\_temp}$ denotes the temporary number of puncturing bits, $K_{bch}$ denotes the maximum number of input information bits of a BCH block, $K_{sig}$ denotes the number of bits obtained by adding padding bits to the number of bits of the L1 signaling information, and $\lfloor x \rfloor$ indicates a maximum integer less than or equal to x.

10. The method of claim 7, wherein calculating a temporary number of codeword bits comprises:
    calculating the temporary number of codeword bits of each coded block based on the number of input information bits of each coded block, a number of parity bits of a BCH block, the temporary number of puncturing bits, and an effective code rate of the coded blocks.

11. The method of claim 7, wherein calculating a final number of codeword bits comprises:
calculating the final number of codeword bits based on the temporary number of codeword bits, a number of symbols used for transmission of L1 signaling information, and the modulation order.

12. The method of claim 7, wherein the final number of codeword bits is calculated in accordance with the following equation:

$$N_{post} = \begin{cases} \text{If } N_{fixedP2} = 1, & \left\lceil \frac{N_{post\_temp}}{2\eta_{MOD}} \right\rceil \times 2\eta_{MOD}, \\ \text{Otherwise,} & \left\lceil \frac{N_{post\_temp}}{\eta_{MOD} \times N_{fixedP2}} \right\rceil \times \eta_{MOD} \times N_{fixedP2} \end{cases}$$

where $N_{post}$ denotes the final number of codeword bits, $N_{post\_temp}$ denotes the temporary number of codeword bits, $\eta_{MOD}$ denotes the modulation order, $N_{fixedP2}$ denotes a number of symbols used for transmission of L1 signaling information P2, and $\lceil x \rceil$ indicates a minimum integer greater than or equal to x.

13. The method of claim 12, wherein the modulation order is 1, 2, 4 and 6 for Binary Phase Shift Keying (BPSK), Quadrature Phase Shift Keying (QPSK), 16-ary Quadrature Amplitude Modulation (16-QAM) and 64-QAM, respectively.

14. The method of claim 7, wherein the final number of puncturing bits is calculated in accordance with the following equation:

$$N_{punc} = N_{punc\_temp} - (N_{post} - N_{post\_temp})$$

where $N_{punc}$ denotes the final number of puncturing bits, $N_{punc\_temp}$ denotes the temporary number of puncturing bits, $N_{post}$ denotes the final number of codeword bits, and $N_{post\_temp}$ denotes the temporary number of codeword bits.

15. The method of claim 1, wherein the number of coded blocks is determined in accordance with the following equation:

$$N_{post\_FEC\_Blocks} = \left\lceil \frac{K_{post\_pure}}{N_{post\_max\_per\_symbol}} \right\rceil$$

where $N_{post\_FEC\_Blocks}$ denotes the number of coded blocks, $K_{post\_pure}$ denotes the number of bits of the L1 signaling information, $N_{post\_max\_per\_symbol}$ denotes a maximum number of bits capable of carrying the L1 signaling information in one OFDM symbol, and $\lceil x \rceil$ indicates a minimum integer greater than or equal to x.

16. The method of claim 7, wherein the final number of codeword bits is calculated considering a depth of time interleaving when a time interleaving technique is used for transmission of the L1 signaling information.

17. The method of claim 7, wherein the final number of codeword bits is calculated in accordance with the following equation:

$$N_{post} = \begin{cases} \text{If } L1\_TI\_depth = 00 \text{ or } 01, \\ \left\lceil \frac{N_{post\_temp}}{2\eta_{MOD} \times N_{post\_FEC\_Blocks}} \right\rceil \times 2\eta_{MOD} \times N_{post\_FEC\_Blocks}, \\ \text{Otherwise,} \\ \left\lceil \frac{N_{post\_temp}}{2\eta_{MOD} N_{L1\_TI\_depth}} \right\rceil \times 2\eta_{MOD} \times N_{L1\_TI\_depth}. \end{cases}$$

where $N_{post}$ denotes the final number of codeword bits, $N_{post\_temp}$ denotes the temporary number of codeword bits, $\eta_{MOD}$ denotes the modulation order, $N_{post\_FEC\_Blocks}$ denotes the number of coded blocks, $N_{L1\_TI\_depth}$ depth denotes a depth of time interleaving, and $\lceil x \rceil$ indicates a minimum integer greater than or equal to x.

18. The method of claim 7, wherein the temporary number of codeword bits is calculated in accordance with the following equation:

$$N_{post\_temp} = K_{sig} + N_{bch\_parity} + 16{,}200 \times (1 - R_{eff}) - N_{punc\_temp}$$

where $N_{post\_temp}$ denotes the temporary number of codeword bits, $K_{sig}$ denotes the number of input information bits of each coded block, $N_{bch\_parity}$ denotes a number of parity bits used in a BCH block, an effective code rate of each coded block is indicated by $R_{eff}$, and $N_{punc\_temp}$ denotes the temporary number of puncturing bits.

19. The method of claim 1, wherein the coded block is encoded by LDPC coding.

20. The method of claim 1, wherein determining a number of coded blocks comprises:
determining the number of coded blocks depending on a value obtained by dividing the number of bits of the L1 signaling information by a maximum number of bits carrying the L1 signaling information in one OFDM symbol.

21. The method of claim 1, wherein a time interleaving technique is considered for the L1 signaling information and wherein determining a number of puncturing bits further comprises:
calculating a temporary number of puncturing bits and a temporary number of codeword bits of each coded block;
calculating a final number of codeword bits of each coded block in accordance with a modulation order, time interleaving depth and the temporary number of codeword bits; and
calculating a final number of puncturing bits in accordance with the temporary number of puncturing bits, the temporary number of codeword bits and the final number of codeword bits.

22. An apparatus for transmitting control information in a broadcasting/communication system, the apparatus comprising:
an encoder for encoding input information into a coded block;
a transmission unit for transmitting a frame including the coded block; and
a controller for determining a number of coded blocks through which Layer 1 (L1) signaling information is to be transmitted, based on a number of bits of the L1 signaling information included in the control information, calculating a number of input information bits of each coded block when there is a plurality of blocks, determining a number of puncturing bits of each coded block to be transmitted, and controlling an operation of the encoder to generate the determined number of coded blocks, each coded block comprising the calculated number of input information bits and punctured based on the determined number of puncturing bits, and an operation of the transmitter to the frame including one or more coded blocks generated.

23. The apparatus of claim 22, wherein the controller determines the number of coded blocks depending on a value obtained by dividing the number of bits of the L1 signaling information by a maximum number of input bits of a Bose, Chaudhuri, and Hocquenghem (BCH) block in a BCH code.

24. The apparatus of claim 22, wherein the number of coded blocks is determined in accordance with the following equation:

$$N_{post\_FEC\_Blocks} = \left\lceil \frac{K_{post\_pure}}{K_{bch}} \right\rceil$$

where $N_{post\_FEC\_Blocks}$ denotes the number of coded blocks, $K_{post\_pure}$ denotes the number of bits of the L1 signaling information, $K_{bch}$ denotes a maximum number of input bits of a BCH block, and $\lceil x \rceil$ indicates a minimum integer greater than or equal to x.

25. The apparatus of claim 22, wherein each of the coded blocks has an equal number of input information bits.

26. The apparatus of claim 22, wherein the controller is further adapted to find a value by adding one or more padding bits to the number of bits of the L1 signaling information, and calculating the number of input information bits by dividing the value by the number of coded blocks when the number of bits of the L1 signaling information cannot be divided by the number of coded blocks.

27. The apparatus of claim 22, wherein the controller is further adapted to calculate a temporary number of puncturing bits and a temporary number of codeword bits of each coded block, calculate a final number of codeword bits of each coded block in accordance with a modulation order and the temporary number of codeword bits, and determining a final number of puncturing bits, calculated using the temporary number of puncturing bits, the temporary number of codeword bits and the final number of codeword bits, into the number of puncturing bits.

28. The apparatus of claim 27, wherein the temporary number of puncturing bits is determined in accordance with the following equation:

$$N_{punch\_temp} = \left\lfloor \frac{6}{5} \times (K_{bch} - K_{sig}) \right\rfloor$$

where $N_{punc\_temp}$ denotes the temporary number of puncturing bits, $K_{bch}$ denotes the maximum number of input information bits of a BCH block, $K_{sig}$ denotes the number of bits obtained by adding padding bits to the number of bits of the L1 signaling information, and $\lfloor x \rfloor$ indicates a maximum integer less than or equal to x.

29. The apparatus of claim 27, wherein the final number of codeword bits is calculated in accordance with the following equation:

$$N_{post} = \begin{cases} \text{If } N_{fixedP2} = 1, & \left\lceil \frac{N_{post\_temp}}{2\eta_{MOD}} \right\rceil \times 2\eta_{MOD}, \\ \text{Otherwise,} & \left\lceil \frac{N_{post\_temp}}{\eta_{MOD} \times N_{fixedP2}} \right\rceil \times \eta_{MOD} \times N_{fixedP2} \end{cases}$$

where $N_{post}$ denotes the final number of codeword bits, $N_{post\_temp}$ denotes the temporary number of codeword bits, $\eta_{MOD}$ denotes the modulation order, $N_{fixedP2}$ denotes a number of symbols used for transmission of L1 signaling information P2, and $\lceil x \rceil$ indicates a minimum integer greater than or equal to x.

30. The apparatus of claim 29, wherein the modulation order is 1, 2, 4 and 6 for Binary Phase Shift Keying (BPSK), Quadrature Phase Shift Keying (QPSK), 16-ary Quadrature Amplitude Modulation (16-QAM) and 64-QAM, respectively.

31. The apparatus of claim 27, wherein the final number of puncturing bits is calculated in accordance with the following equation:

$$N_{punc} = N_{punc\_temp} - (N_{post} - N_{post\_temp})$$

where $N_{punc}$ denotes the final number of puncturing bits, $N_{punc\_temp}$ denotes the temporary number of puncturing bits, $N_{post}$ denotes the final number of codeword bits, and $N_{post\_temp}$ denotes the temporary number of codeword bits.

32. The apparatus of claim 22, wherein the number of coded blocks is determined in accordance with the following equation:

$$N_{post\_FEC\_Blocks} = \left\lceil \frac{K_{post\_pure}}{N_{post\_max\_per\_symbol}} \right\rceil$$

where $N_{post\_FEC\_Blocks}$ denotes the number of coded blocks, $K_{post\_pure}$ denotes the number of bits of the L1 signaling information, $N_{post\_max\_per\_symbol}$ denotes a maximum number of bits capable of carrying the L1 signaling information in one OFDM symbol, and $\lceil x \rceil$ indicates a minimum integer greater than or equal to x.

33. The apparatus of claim 27, wherein the final number of codeword bits is calculated considering a depth of time interleaving when a time interleaving technique is used for transmission of the L1 signaling information.

34. The apparatus of claim 27, wherein the final number of codeword bits is calculated in accordance with:

$$N_{post} = \begin{cases} \text{If } L1\_TI\_depth = 00 \text{ or } 01, \\ \left\lceil \frac{N_{post\_temp}}{2\eta_{MOD} \times N_{post\_FEC\_Blocks}} \right\rceil \times 2\eta_{MOD} \times N_{post\_FEC\_Blocks}, \\ \text{Otherwise,} \\ \left\lceil \frac{N_{post\_temp}}{2\eta_{MOD} N_{L1\_TI\_depth}} \right\rceil \times 2\eta_{MOD} \times N_{L1\_TI\_depth}, \end{cases}$$

where $N_{post}$ denotes the final number of codeword bits, $N_{post\_temp}$ denotes the temporary number of codeword bits, $\eta_{MOD}$ denotes the modulation order, $N_{post\_FEC\_Blocks}$ denotes the number of coded blocks, $N_{L1\_TI\_depth}$ denotes a depth of time interleaving, and $\lceil x \rceil$ indicates a minimum integer greater than or equal to x.

35. The apparatus of claim 22, wherein the coded block is encoded by Low Density Parity Check (LDPC) coding.

36. The apparatus of claim 27, wherein the controller is further adapted to calculate the temporary number of puncturing bits based on a difference between a maximum number of input information bits of a BCH block and the number of input information bits of each coded block.

37. The apparatus of claim 27, wherein the controller is further adapted to calculate the temporary number of codeword bits of each coded block based on the number of input information bits of each coded block, a number of parity bits of a BCH block, the temporary number of puncturing bits, and an effective code rate of the coded blocks.

38. The apparatus of claim 27, wherein the controller is further adapted to calculate calculating the final number of codeword bits based on the temporary number of codeword bits, a number of symbols used for transmission of L1 signaling information, and the modulation order.

39. The apparatus of claim 24, wherein the maximum number of input bits of the BCH block is determined in accordance with the following equation:

$$K_{bch} = 16{,}200 \times R_{eff} - N_{bch\_parity}$$

when an LDPC block is used as a coded block with a size of 16,200 bits, an effective code rate is indicated by $R_{eff}$, and the number of parity bits used in the BCH code is denoted by $N_{bch\_parity}$.

40. The apparatus of claim 27, wherein the temporary number of codeword bits is calculated in accordance with the following equation:

$$N_{post\_temp} = K_{sig} + N_{bch\_parity} + 16{,}200 \times (1 - R_{eff}) - N_{punc\_temp}$$

where $N_{post\_temp}$ denotes the temporary number of codeword bits, $K_{sig}$ denotes the number of input information bits of each coded block, $N_{bch\_parity}$ denotes a number of parity bits used in a BCH block, an effective code rate of each coded block is indicated by $R_{eff}$, and $N_{punc\_temp}$ denotes the temporary number of puncturing bits.

41. A method for receiving control information in a broadcasting/communication system, the method comprising the steps of:
acquiring information on a number of bits of Layer 1 (L1) signaling information;
calculating a number of coded blocks into which the L1 signaling information is divided;
calculating a number of input information bits of each coded block, and calculating a number of puncturing bits among parity bits of each coded block; and
decoding one or more received coded blocks based on the information acquired and calculated in the preceding steps.

42. The method of claim 41, wherein the number of bits of the L1 signaling information is defined by adding a number of padding bits to a number of information bits.

43. The method of claim 42, wherein the number of coded blocks divided from the L1 signaling information is calculated in accordance with a value obtained by dividing the number of bits of the L1 signaling information by a maximum number of input bits of a Bose, Chaudhuri, and Hocquenghem (BCH) block.

44. The method of claim 43, wherein the number of input information bits of each coded block is calculated based on a value obtained by dividing the number of bits of the L1 signaling information by the number of coded blocks.

45. The method of claim 41, wherein each of the coded blocks has an equal number of input information bits.

46. The method of claim 41, wherein calculating a number of puncturing bits among parity bits further comprises:
calculating a temporary number of puncturing bits and a temporary number of codeword bits of each coded block;
calculating a final number of codeword bits of each coded block based on a modulation order and the temporary number of codeword bits; and
calculating a final number of puncturing bits based on the temporary number of puncturing bits, the temporary number of codeword bits, and the final number of codeword bits.

47. The method of claim 46, wherein the temporary number of puncturing bits is determined in accordance with the following equation:

$$N_{punc\_temp} = \left\lfloor \frac{6}{5} \times (K_{bch} - K_{sig}) \right\rfloor$$

where $N_{punc\_temp}$ denotes the temporary number of puncturing bits, $K_{bch}$ denotes the maximum number of input information bits of a BCH block, $K_{sig}$ denotes the number of bits obtained by adding padding bits to the number of bits of the L1 signaling information, and $\lfloor x \rfloor$ indicates a maximum integer less than or equal to x.

48. The method of claim 46, wherein the final number of codeword bits is calculated in accordance with the following equation:

$$N_{post} = \begin{cases} \text{If } N_{fixedP2} = 1, & \left\lceil \dfrac{N_{post\_temp}}{2\eta_{MOD}} \right\rceil \times 2\eta_{MOD}, \\ \text{Otherwise}, & \left\lceil \dfrac{N_{post\_temp}}{\eta_{MOD} \times N_{fixedP2}} \right\rceil \times \eta_{MOD} \times N_{fixedP2} \end{cases}$$

where $N_{post}$ denotes the final number of codeword bits, $N_{post\_temp}$ denotes the temporary number of codeword bits, $\eta_{MOD}$ denotes the modulation order, $N_{fixedP2}$ denotes a number of symbols used for transmission of L1 signaling information P2, and $\lceil x \rceil$ indicates a minimum integer greater than or equal to x.

49. The method of claim 48, wherein the modulation order is 1, 2, 4 and 6 for Binary Phase Shift Keying (BPSK), Quadrature Phase Shift Keying (QPSK), 16-ary Quadrature Amplitude Modulation (16-QAM) and 64-QAM, respectively.

50. The method of claim 46, wherein the final number of puncturing bits is calculated in accordance with the following equation:

$$N_{punc} = N_{punc\_temp} - (N_{post} - N_{post\_temp})$$

where $N_{punc}$ denotes the final number of puncturing bits, $N_{punc\_temp}$ denotes the temporary number of puncturing bits, $N_{post}$ denotes the final number of codeword bits, and $N_{post\_temp}$ denotes the temporary number of codeword bits.

51. The method of claim 41, wherein the number of coded blocks is determined in accordance with the following equation:

$$N_{post\_FEC\_Blocks} = \left\lceil \frac{K_{post\_pure}}{N_{post\_max\_per\_symbol}} \right\rceil$$

where $N_{post\_FEC\_Blocks}$ denotes the number of coded blocks, $K_{post\_pure}$ denotes the number of bits of the L1 signaling information, $N_{post\_max\_per\_symbol}$ denotes a maximum number of bits capable of carrying the L1 signaling information in one Orthogonal Frequency Division Multiplexing (OFDM) symbol, and $\lceil x \rceil$ indicates a minimum integer greater than or equal to x.

52. The method of claim 46, wherein the final number of codeword bits is calculated considering a depth of time interleaving when a time interleaving technique is used for transmission of the L1 signaling information.

53. The method of claim 46, wherein the final number of codeword bits is calculated in accordance with the following equation:

$$N_{post} = \begin{cases} \text{If L1\_TI\_depth} = 00 \text{ or } 01, \\ \left\lceil \frac{N_{post\_temp}}{2\eta_{MOD} \times N_{post\_FEC\_Blocks}} \right\rceil \times 2\eta_{MOD} \times N_{post\_FEC\_Blocks}, \\ \text{Otherwise,} \\ \left\lceil \frac{N_{post\_temp}}{2\eta_{MOD} N_{L1\_TI\_depth}} \right\rceil \times 2\eta_{MOD} \times N_{L1\_TI\_depth}, \end{cases}$$

where $N_{post}$ denotes the final number of codeword bits, $N_{post\_temp}$ denotes the temporary number of codeword bits, $\eta_{MOD}$ denotes the modulation order, $N_{post\_FEC\_Blocks}$ denotes the number of coded blocks, $N_{L1\_TI\_depth}$ denotes a depth of time interleaving, and $\lceil x \rceil$ indicates a minimum integer greater than or equal to x.

54. The method of claim 46, wherein calculating a temporary number of puncturing bits further comprises:
calculating the temporary number of puncturing bits based on a difference between a maximum number of input information bits of a BCH block and the number of input information bits of each coded block.

55. The method of claim 46, wherein calculating a temporary number of codeword bits further comprises:
calculating the temporary number of codeword bits of each coded block based on the number of input information bits of each coded block, a number of parity bits of a BCH block, the temporary number of puncturing bits, and an effective code rate of the coded blocks.

56. The method of claim 46, wherein calculating a final number of codeword bits further comprises:
calculating the final number of codeword bits based on the temporary number of codeword bits, a number of symbols used for transmission of L1 signaling information, and the modulation order.

57. The method of claim 41, wherein the number of coded blocks is determined in accordance with the following equation:

$$N_{post\_FEC\_Blocks} = \left\lceil \frac{K_{post\_pure}}{K_{bch}} \right\rceil$$

where $N_{post\_FEC\_Blocks}$ denotes the number of coded blocks, $K_{post\_pure}$ denotes the number of bits of the L1 signaling information, $K_{bch}$ denotes a maximum number of input bits of a BCH block, and $\lceil x \rceil$ indicates a minimum integer greater than or equal to x.

58. The method of claim 43, wherein the maximum number of input bits of the BCH block is determined in accordance with the following equation:

$$K_{bch} = 16{,}200 \times R_{eff} - N_{bch\_parity}$$

when a Low Density Parity Check (LDPC) block is used as a coded block with a size of 16,200 bits, an effective code rate is indicated by $R_{eff}$, and the number of parity bits used in the BCH code is denoted by $N_{bch\_parity}$.

59. The method of claim 46, wherein the temporary number of codeword bits is calculated in accordance with the following equation:

$$N_{post\_temp} = K_{sig} + N_{bch\_parity} + 16{,}200 \times (1 - R_{eff}) - N_{punc\_temp}$$

where $N_{post\_temp}$ denotes the temporary number of codeword bits, $K_{sig}$ denotes the number of input information bits of each coded block, $N_{bch\_parity}$ denotes a number of parity bits used in a BCH block, an effective code rate of each coded block is indicated by $R_{eff}$, and $N_{punc\_temp}$ denotes the temporary number of puncturing bits.

60. The method of claim 41, wherein the coded block is encoded by LDPC coding.

61. The method of claim 41, wherein the number of coded blocks divided from the L1 signaling information is calculated in accordance with a value obtained by dividing the number of bits of the L1 signaling information by a maximum number of bits carrying the L1 signaling information in one OFDM symbol.

62. The method of claim 41, wherein a time interleaving technique is considered for the L1 signaling information and wherein calculating a number of puncturing bits further comprises:
calculating a temporary number of puncturing bits and a temporary number of codeword bits of each coded block;
calculating a final number of codeword bits of each coded block in accordance with a modulation order, time interleaving depth and the temporary number of codeword bits; and calculating a final number of puncturing bits in accordance with the temporary number of puncturing bits, the temporary number of codeword bits and the final number of codeword bits.

63. An apparatus for receiving control information in a broadcasting/communication system, the apparatus comprising:
a receiving unit for receiving and decoding control information including Layer 1 (L1) signaling information; and
a controller for acquiring information on a number of bits of the L1 signaling information from a currently received frame, calculating a number of coded blocks into which the L1 signaling information is divided, calculating a number of input information bits of each coded block, calculating a number of puncturing bits, and controlling an operation of the receiving unit to decode one or more received coded blocks based on the information acquired and calculated in the preceding steps.

64. The apparatus of claim 63, wherein the number of bits of the L1 signaling information is defined by adding a number of padding bits to a number of information bits.

65. The apparatus of claim 64, wherein the controller calculates the number of coded blocks divided from the L1 signaling information in accordance with a value obtained by dividing the number of bits of the L1 signaling information by a maximum number of input bits of a Bose, Chaudhuri, and Hocquenghem (BCH) block.

66. The apparatus of claim 65, wherein the controller calculates the number of input information bits of each coded block based on a value obtained by dividing the number of bits of the L1 signaling information by the number of coded blocks.

67. The apparatus of claim 63, wherein each of the coded blocks has an equal number of input information bits.

68. The apparatus of claim 63, wherein the controller is adapted to calculate a temporary number of puncturing bits and a temporary number of codeword bits of each coded block, calculate a final number of codeword bits of each coded block based on a modulation order and the temporary number of codeword bits, and calculate a final number of puncturing bits based on the temporary number of puncturing bits, the temporary number of codeword bits, and the final number of codeword bits.

69. The apparatus of claim 68, wherein the temporary number of puncturing bits is determined in accordance with the following equation:

$$N_{punc\_temp} = \left\lfloor \frac{6}{5} \times (K_{bch} - K_{sig}) \right\rfloor$$

where $N_{punc\_temp}$ denotes the temporary number of puncturing bits, $K_{bch}$ denotes the maximum number of input information bits of a BCH block, $K_{sig}$ denotes the number of bits obtained by adding padding bits to the number of bits of the L1 signaling information, and $\lfloor x \rfloor$ indicates a maximum integer less than or equal to x.

70. The apparatus of claim 68, wherein the final number of codeword bits is calculated in accordance with the following equation:

$$N_{post} = \begin{cases} \text{If } N_{fixedP2} = 1, & \left\lceil \frac{N_{post\_temp}}{2\eta_{MOD}} \right\rceil \times 2\eta_{MOD}, \\ \text{Otherwise}, & \left\lceil \frac{N_{post\_temp}}{\eta_{MOD} \times N_{fixedP2}} \right\rceil \times \eta_{MOD} \times N_{fixedP2} \end{cases}$$

where $N_{post}$ denotes the final number of codeword bits, $N_{post\_temp}$ denotes the temporary number of codeword bits, $\eta_{MOD}$ denotes the modulation order, $N_{fixedP2}$ denotes a number of symbols used for transmission of L1 signaling information P2, and $\lceil x \rceil$ indicates a minimum integer greater than or equal to x.

71. The apparatus of claim 70, wherein the modulation order is 1, 2, 4 and 6 for Binary Phase Shift Keying (BPSK), Quadrature Phase Shift Keying (QPSK), 16-ary Quadrature Amplitude Modulation (16-QAM) and 64-QAM, respectively.

72. The apparatus of claim 68, wherein the final number of puncturing bits is calculated in accordance with the following equation:

$$N_{punc} = N_{punc\_temp} - (N_{post} - N_{post\_temp})$$

where $N_{punc}$ denotes the final number of puncturing bits, $N_{punc\_temp}$ denotes the temporary number of puncturing bits, $N_{post}$ denotes the final number of codeword bits, and $N_{post\_temp}$ denotes the temporary number of codeword bits.

73. The apparatus of claim 63, wherein the number of coded blocks is determined in accordance with the following equation:

$$N_{post\_FEC\_Blocks} = \left\lceil \frac{K_{post\_pure}}{N_{post\_max\_per\_symbol}} \right\rceil$$

where $N_{post\_FEC\_Blocks}$ denotes the number of coded blocks, $K_{post\_pure}$ denotes the number of bits of the L1 signaling information, $N_{post\_max\_per\_symbol}$ denotes a maximum number of bits capable of carrying the L1 signaling information in one Orthogonal Frequency Division Multiplexing (OFDM) symbol, and $\lceil x \rceil$ indicates a minimum integer greater than or equal to x.

74. The apparatus of claim 68, wherein the final number of codeword bits is calculated considering a depth of time interleaving when a time interleaving technique is used for transmission of the L1 signaling information.

75. The apparatus of claim 68, wherein the final number of codeword bits is calculated in accordance with the following equation:

$$N_{post} = \begin{cases} \text{If } L1\_TI\_depth = 00 \text{ or } 01, \\ \left\lceil \frac{N_{post\_temp}}{2\eta_{MOD} \times N_{post\_FEC\_Blocks}} \right\rceil \times 2\eta_{MOD} \times N_{post\_FEC\_Blocks}, \\ \text{Otherwise}, \\ \left\lceil \frac{N_{post\_temp}}{2\eta_{MOD} N_{L1\_TI\_depth}} \right\rceil \times 2\eta_{MOD} \times N_{L1\_TI\_depth}, \end{cases}$$

where Npost denotes the final number of codeword bits, Npost_temp denotes the temporary number of codeword bits, $\eta_{MOD}$ denotes the modulation order, $N_{post\_FEC\_Blocks}$ denotes the number of coded blocks, $N_{L1\_TI\_depth}$ denotes a depth of time interleaving, and $\lceil x \rceil$ indicates a minimum integer greater than or equal to x.

76. The apparatus of claim 68, wherein the controller is further adapted to calculate the temporary number of puncturing bits based on a difference between a maximum number of input information bits of a BCH block and the number of input information bits of each coded block.

77. The apparatus of claim 68, wherein the controller is further adapted to calculate the temporary number of codeword bits of each coded block based on the number of input information bits of each coded block, a number of parity bits of a BCH block, the temporary number of puncturing bits, and an effective code rate of the coded blocks.

78. The apparatus of claim 68, wherein the controller is further adapted to calculate calculating the final number of codeword bits based on the temporary number of codeword bits, a number of symbols used for transmission of L1 signaling information, and the modulation order.

79. The apparatus of claim 63, wherein the number of coded blocks is determined in accordance with the following equation:

$$N_{post\_FEC\_Blocks} = \left\lceil \frac{K_{post\_pure}}{K_{bch}} \right\rceil$$

where $N_{post\_FEC\_Blocks}$ denotes the number of coded blocks, $K_{post\_pure}$ denotes the number of bits of the L1 signaling information, $K_{bch}$ denotes a maximum number of input bits of a BCH block, and $\lceil x \rceil$ indicates a minimum integer greater than or equal to x.

80. The apparatus of claim 65, wherein the maximum number of input bits of the BCH block is determined in accordance with the following equation:

$$K_{bch}=16{,}200 \times R_{eff} - N_{bch\_parity}$$

when a Low Density Parity Check (LDPC) block is used as a coded block with a size of 16,200 bits, an effective code rate is indicated by $R_{eff}$, and the number of parity bits used in the BCH code is denoted by $N_{bch\_parity}$.

81. The apparatus of claim 65, wherein the temporary number of codeword bits is calculated in accordance with the following equation:

$$N_{post\_temp}=K_{sig}+N_{bch\_parity}+16{,}200\times(1-R_{eff})-N_{punc\_temp}$$

where $N_{post\_temp}$ denotes the temporary number of codeword bits, $K_{sig}$ denotes the number of input information bits of each coded block, $N_{bch\_parity}$ denotes a number of parity bits used in a BCH block, an effective code rate of each coded block is indicated by $R_{eff}$, and $N_{punc\_temp}$ denotes the temporary number of puncturing bits.

82. The apparatus of claim 63, wherein the coded block is encoded by LDPC coding.

\* \* \* \* \*